United States Patent Office 3,282,895
Patented Nov. 1, 1966

3,282,895
TRIAZENE DERIVATIVES
John E. Franz, Crestwood, and Carl Osuch, Kirkwood, Mo., assignors to Monsanto Company, a corporation of Delaware
No Drawing. Filed Jan. 4, 1963, Ser. No. 249,316
5 Claims. (Cl. 260—47)

This invention relates to a novel class of triazene derivatives, and particularly to phosphazides obtained by the reaction of tertiary phosphines with specific types of organic azides. The azides utilized in preparing the compounds of the present invention are those obtained by the reaction of an alkali metal azide with a reactive sulfonyl or sulfamyl halide.

The novel phosphazides of the present invention have the general formula,

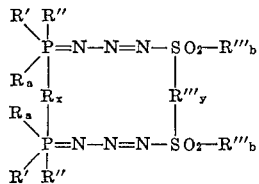

wherein R, R' and R" can be like or unlike and are alkyl, cycloalkyl, aryl, aralkyl, heterocyclic, dialkylamino or diarylamino radicals containing from one to 18 carbon atoms; R''' is an alkyl, cycloalkyl, aryl, aralkyl, heterocyclic, alkoxy, aroxy, aralkoxy, amino and mono- and di-substituted amino radicals containing from one to 18 carbon atoms; $x$ and $y$ are whole numbers from 0 to 1, and their maximum sum is 1; and $a$ and $b$ are whole numbers from 0 to 1, with the sum of $a$ and $x$ being 1 and the sum of $b$ and $y$ also being 1.

It is an object of this invention to provide new phosphazides and methods of preparing them. An additional object is to provide novel polymers and improved chemical intermediates.

These and other objects can be accomplished in accordance with the present invention, generally speaking, by reacting a tertiary phosphine with a sulfonyl or sulfamyl azide. Either or both of these reactants can be mono- or di-functional. Substantially any of the tertiary phosphines can be utilized in the present invention. Suitable tertiary phosphines include trimethyl phosphine, triethyl phosphine, tributyl phosphine, methyl diethyl phosphine, tri(dodecyl) phosphine, tri(octadecyl) phosphine, triphenyl phosphine, tritolyl phosphine, tri(dodecylphenyl) phosphine, octadecyl diphenyl phosphine, hexamethylphosphoramide, and the like.

The azides employed are sulfonyl and sulfamyl azides containing between one and 18 carbon atoms in each of their hydrocarbon groups. Satisfactory azides of this type include methyl sulfonyl azide, ethyl sulfonyl azide, butyl sulfonyl azide, dimethylbenzyl sulfonyl azide, methylethylbenzyl sulfonyl azide, dodecylbenzyl sulfonyl azide, octadecyl sulfonyl azide, benzyl sulfonyl azide, tolyl sulfonyl azide, para-nitrobenzene sulfonyl azide, para-chlorobenzene sulfonyl azide, α-naphthalene sulfonyl azide, β-pyridine sulfonyl azide, dimethyl sulfamyl azide, diethyl sulfamyl azide, di(octadecyl) sulfamyl azide, and the like. Other azides having the general formula indicated above can be used with equal facility.

The reaction proceeds quite readily using substantially equimolar proportions of the reactants. Although a solvent is not essential, it is generally preferred to execute the reaction in a solvent or solvent system which is inert to the reactants. Representative solvents that can be employed include ether, normal hexane, benzene, carbon tetrachloride, and the like. The reaction is generally conducted under atmospheric or higher pressures and at a temperature between about −20° C. and about 30° C., preferably between about 0° C. and about 20° C. The particular reaction conditions depend, to a great extent, upon the specific reactants involved.

The starting materials and the products obtained are shown by the following equations, in which R, R', R" and R''' are identified as indicated above.

(1)
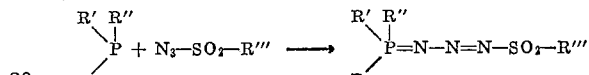

(2)
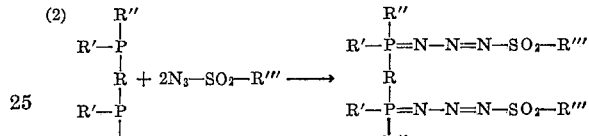

(3)
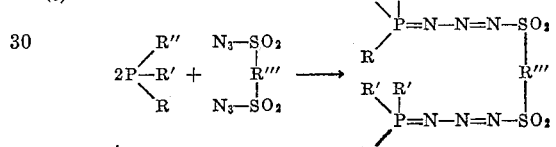

(4)
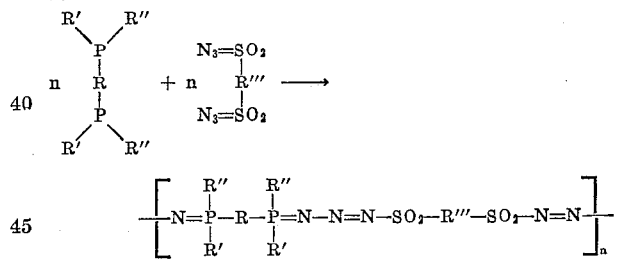

The first equation illustrates the reaction between monofunctional phosphines and azides. Equation 2 shows the reaction between a difunctional phosphine and a monofunctional azide, while the third equation is directed to the reaction between a monofunctional phosphine and a difunctional azide. Polyfunctional reactants can also be employed to obtain correspondingly similar products. When both the azide and the phosphine are at least difunctional, polymeric materials having recurring units of the type shown in the last equation are obtained. The reaction proceeds quite smoothly, and without the evolution of nitrogen. After the reaction has gone to completion, the phosphazides formed can be separated from the reaction mixture by filtration, centrifugation or by any other conventional means.

The details of the invention will be more fully understood by reference to the following examples, which set forth representative starting materials, quantities of materials, and reaction conditions. These materials are not to be construed as limiting the scope of the invention, but are solely for purposes of illustration.

*Example 1.—Adduct of triphenylphosphine and benzenesulfonyl azide* $(C_6H_5)_3—P=N—N=N—SO_2—C_6H_5$ A solution of about 1.4 grams (0.005 mol) of triphenylphosphine in 10 milliliters of diethyl ether is prepared at room temperature and swirled in a round-bottomed flask. While swirling, about 0.9 gram (0.005 mol) of benzenesulfonyl azide dissolved in 15 milliliters of diethyl ether is added dropwise to the flask. This addition is accompanied by the formation of a pale yellow precipitate. The precipitate is separated from the reaction mixture by filtration, and purified by dissolving in chloroform, from which it is crystallized by the addition of ether. The adduct is a yellow crystalline material which decomposes at 94–95° C. Its composition is confirmed by infrared spectral analysis and the following chemical analysis:

Calculated for $C_{24}H_{20}N_3PSO_2$: C, 64.70; H, 4.53; N, 9.43. Found: C, 64.94; H, 4.70; N, 9.30.

*Example 2.—Adduct of triphenylphosphine and p-tosyl azide* $(C_6H_5)_3—P=N—N=N—SO_2—C_6H_4—CH_3$ The procedure of Example 1 is substantially repeated using para-tosyl azide in place of benzenesulfonyl azide. In conducting this reaction, about 0.985 gram (0.005 mol) of tosyl azide dissolved in ether is added dropwise to an ether solution of about 1.31 grams (0.005 mol) of triphenylphosphine to obtain a yellow crystalline material. The adduct melts at about 100° C. with decomposition. The identity of this compound is substantiated by infrared spectrum and the following chemical analysis:

Calculated for $C_{25}H_{22}N_3PSO_2$: C, 65.3; H, 4.8; N, 9.1. Found: C, 65.1; H, 4.7; N, 9.0.

*Example 3. — Adduct of diethylsulfamyl azide and triphenylphosphine* $(C_2H_5)_2—N—SO_2—N=N—N=P(C_6H_5)_3$ About 2.62 grams (0.01 mol) of triphenylphosphine and about 1.78 grams (0.01 mol) of diethylsulfamyl azide are dissolved in separate 10-milliliter portions of diethyl ether at room temperature, and cooled to about 0° C. in an ice bath. Upon dropwise addition of the azide solution to the dissolved phosphine with continued cooling, a yellow oil, together with a few crystals, separates from the solution. Continued stirring of the mixture results in the precipitation of a yellow solid, which is removed by filtration. The precipitate is dissolved in chloroform and recrystallized therefrom with ether. After standing in an ice bath for about one hour, clusters of brilliant yellow crystalline platelets separate from the chloroform-ether mixture. The chemical composition of the crystalline adduct is confirmed by infrared spectral and chemical analysis.

Calculated for $C_{22}H_{25}N_4O_2PS$ (440.513): N, 12.7; S, 7.3; P, 7.0. Found: N, 12.2; S, 7.2; P, 6.7.

*Example 4.—Adduct of triphenylphosphine and n-octyl sulfonyl azide* $(C_6H_5)_3—P=N—N=N—SO_2—C_8H_{17}$ The procedure of Example 2 is substantially repeated using octyl sulfonyl azide in place of para-tosyl azide. A solution of about 2.193 grams (0.01 mol) of normal octyl sulfonyl azide in diethyl ether is added dropwise to an ether solution of 2.632 grams A0.01 mol) of triphenylphosphine. This addition is accompanied by the formation of a heavy yellow oil which separates from the solution and settles to the bottom of the reaction vessel. This oil, the phosphazide of triphenylphosphine and n-octyl sulfonyl azide, is quite unstable even at 0° C., as evidenced by nitrogen evolution. Upon separation from the ether layer and warming to room temperature, the voluminous nitrogen loss results in frothing of the oil and gradual fading of its yellow color. The compound remaining after this decomposition is the corresponding imine, $(C_6H_5)_3—P=N—SO_2—C_8H_{17}$.

*Example 5.—Adduct of benzene sulfonyl azide and tri-n-butyl phosphine* $(n-C_4H_9)_3P=N—N=SO_2—C_6H_5$ A substantial repetition of the process of the above example, using 0.01 mol portions of benzene sulfonyl azide and tri-n-butyl phosphine, results in the formation of a heavy yellow oil. This phosphazide is also unstable and decomposes with loss of nitrogen to form the imide, $(n-C_4H_9)_3—P=N—SO_2—C_6H_5$.

*Example 6*

This example illustrates the preparation of a polymeric product in general accordance with the following reaction:

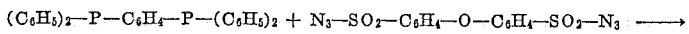
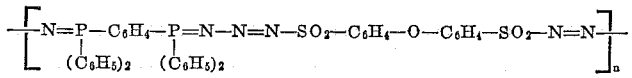

wherein $n$ is an integer greater than 1.

In carrying out this reaction, about 11.15 grams (0.025 mol) of the phenyl bis(triphenyl phosphine) is dissolved in approximately 250 milliliters of acetonitrile and rapidly added, with vigorous agitation, to about 9.5 grams (0.025 mol) of the bisazide in 250 milliliters of acetonitrile. The reaction is conducted at a temperature of about 10° C., and the agitation is continued at this temperature for approximately one-half hour. At the end of this period, substantially all of the polymer has separated from the reaction mixture in the form of a light brown, relatively soft, resinous material. The acetonitrile is readily removed by decantation, followed by heating the polymer to about 50° C. under reduced pressure for approximately one hour. Infrared spectral analysis of this product supports the above structure.

Additional exemplary compounds which are prepared by reacting appropriate tertiary phosphines with sulfonyl and sulfamyl azides in accordance with the procedures described above include:

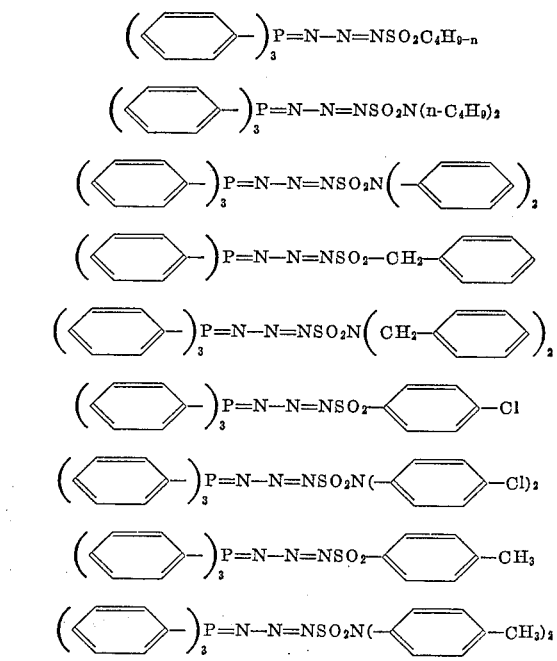

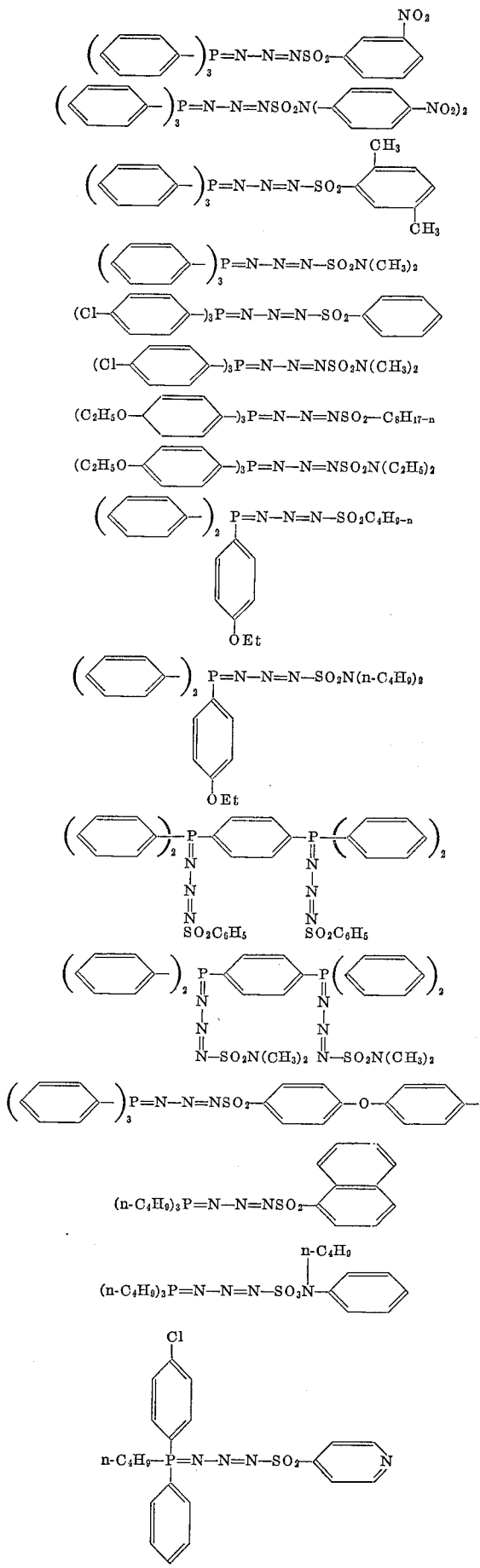
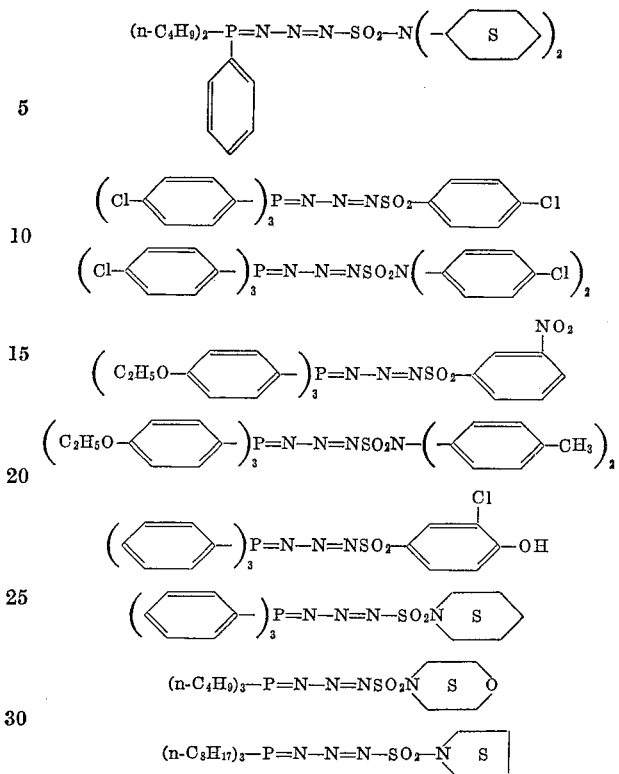

The phosphazide compounds of the present invention are compatible with numerous polymeric systems. This compatibility, coupled with the fact that these compounds evolve nitrogen at elevated temperatures, renders them particularly useful as porphors or blowing agents in the formulation of cellular resinous products. In addition, the phosphazides under consideration are valuable intermediates in the preparation of polymers, lube oil additives, gear oil additives, functional fluids, plasticizers, flame-proofing halogenated agents, and in numerous other industrial applications.

The monomeric phosphazides serve as cross-linking agents for double-bonded pre-polymers, particularly polyesters having ethylenic unsaturation. In this capacity, they behave much in the same fashion as free radicals. Highly halogenated phosphazides, such as

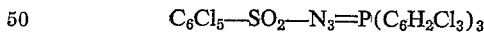

can also be employed as cross-linking agents or resin components to enhance the flame-resistant characteristics of polymeric compositions.

The polymeric phosphazides of the present invention vary in physical conditions from relatively mobile oils to resinous solids. These materials are compatible with a number of other polymeric systems, such as, for example, polyurethanes and epoxy resins, and can be incorporated therein to modify the properties of the basic polymeric system. Also, the solid polyphosphazides can be used alone or in combination with other polymers in the molding of commercial plastic articles.

Although the processes and products of the present invention have been described with particular reference to specific embodiments involving unsubstituted reactants and end products, it will be appreciated that it is not so limited and that various substituents can be present in the hydrocarbon portions of either or both reactants. Suitable substituent groups include chloro, fluoro, bromo, iodo, nitro, amino, cyano, hydroxy, carboxy, alkoxy, aroxy, aralkoxy, alkyl, aryl, and the like. However, it is preferred to maintain unsubstituted those carbons which are alpha or ortho to the phosphorus atoms to avoid any possible steric hindrance.

It is also to be understood that numerous other variations and modifications of the invention obvious to those skilled in the art can be made without departing from the spirit and scope of the present invention.

The embodiments of the invention in which an exclusive property or privilege is claimed are defined as follows:

1. A phosphazide of the formula

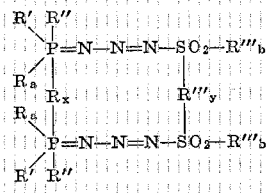

wherein R, R' and R'' are selected from the group consisting of alkyl, aryl, and dialkylamino containing from one to 18 carbon atoms; R''' is selected from the group consisting of alkyl, aryl, aralkyl, and aroxy containing from one to 18 carbon atoms and heterocyclic selected from the group consisting of β-pyridyl, morpholinyl, piperidinyl and pyrrolidinyl; $x$, $y$, $a$ and $b$ are whole numbers from 0 to 1, with the maximum sum of $x$ and $y$ being 1, the sum of $a$ and $x$ being 1, and the sum of $b$ and $y$ being 1.

2. A phosphazide of the structure,

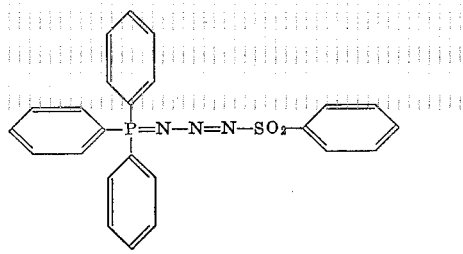

3. A phosphazide of the structure

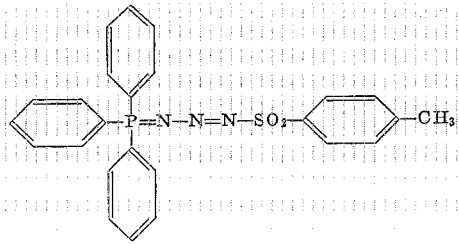

4. A process for the preparation of phosphazides which comprises reacting a tertiary phosphine of the formula, $R(PR'R'')_r$, with an azide of the formula, $(N_3-SO_2)_sR'''$, wherein R, R' and R'' are selected from the group consisting of alkyl, aryl, and dialkylamino containing from one to 18 carbon atoms; R''' is selected from the group consisting of alkyl, aryl, aralkyl, and aroxy radicals containing from one to 18 carbon atoms and heterocyclic selected from the group consisting of β-pyridyl, morpholinyl, piperidinyl and pyrrolidinyl; and $r$ and $s$ are whole numbers from 1 to 2.

5. A polyphosphazide of the formula,

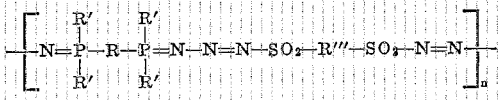

wherein R, R' and R'' are selected from the group consisting of alkyl, aryl, and dialkylamino containing from one to 18 carbon atoms; R''' is selected from the group consisting of alkyl, aryl, aralkyl, and aroxy containing from one to 18 carbon atoms and heterocyclic selected from the group consisting of β-pyridyl, morpholinyl, piperidinyl and pyrrolidinyl; and $n$ is an integer greater than one.

References Cited by the Examiner

Herring, J. Org. Chem., volume 26, pages 3998–9 (1956).

Leffler et al., J. Org. Chem., volume 28, pages 902 to 906 (April 12, 1963).

WALTER A. MODANCE, *Primary Examiner.*

JOHN D. RANDOLPH, *Examiner.*

H. I. MOATZ, *Assistant Examiner.*